Sept. 13, 1960      J. H. GARSSON      2,952,042
PROCESS FOR DEEP DRAWING PLASTIC SHEET
Filed Aug. 31, 1956
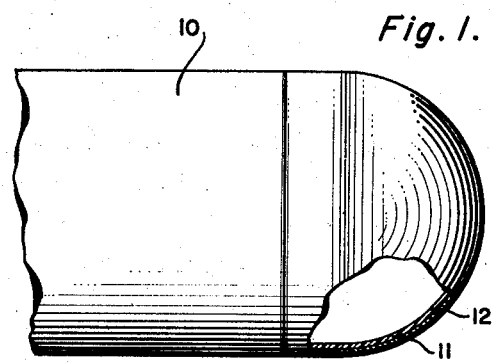
Fig. 1.
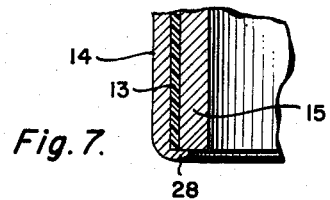
Fig. 7.
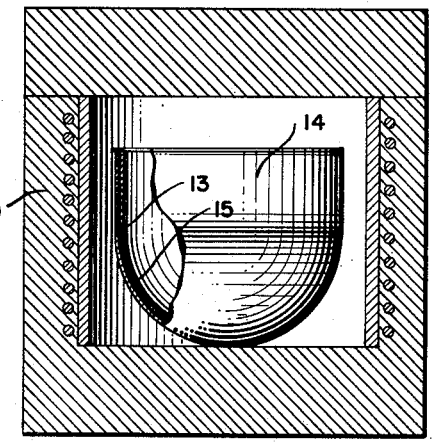
Fig. 8.
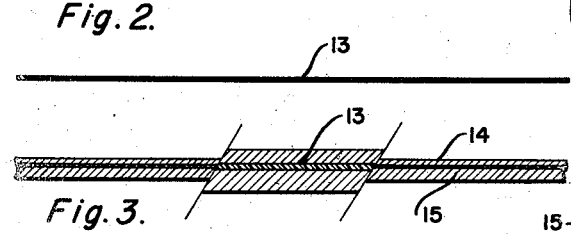
Fig. 2.
Fig. 3.
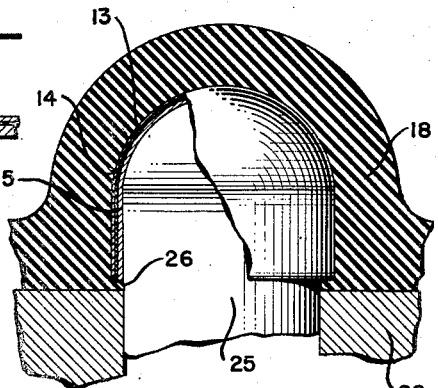
Fig. 5.
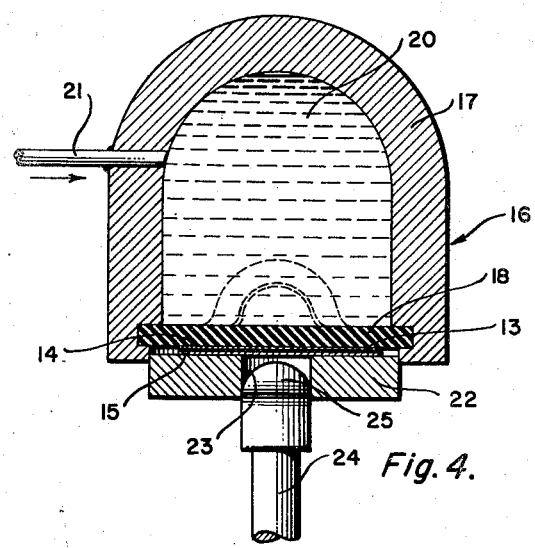
Fig. 4.
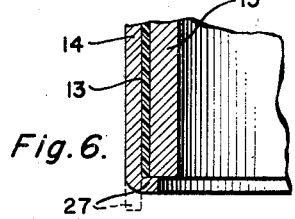
Fig. 6.
INVENTOR.
Joseph H. Garsson,
BY
ATTORNEY.

United States Patent Office 2,952,042
Patented Sept. 13, 1960

2,952,042

PROCESS FOR DEEP DRAWING PLASTIC SHEET

Joseph H. Garsson, Culver City, Calif., assignor to Hughes Aircraft Company, Culver City, Calif., a corporation of Delaware Filed Aug. 31, 1956, Ser. No. 608,646

1 Claim. (Cl. 18—56)

This invention finds general utility in the field of forming processes and particularly in connection with forming of certain types of plastic materials which normally either resist plastic deformation thereof or which have strong memory characteristics.

Generally, the invention relates to a process for shaping normally intractable plastic sheetstock by simultaneously molding a sandwich of plastic material between at least two sheets of ductile metal at substantially ambient temperature, in order to produce a rigid assembly of shaped plastic and metal; heating this assembly after removal from the forming mold to an elevated temperature that is substantially below the softening, melting or fusion point of the plastic material; and thereafter cooling and removing the shaped plastic from the rigid assembly.

Many problems exist in regard to the forming of certain types of plastic sheet material. This forming or molding must be accomplished at substantially ambient temperature in order that the plastic material will not flow substantially until a positive closure of forming dies has been achieved and the metal portions of the sandwich structure shaped to the desired contours. After positive closure of forming dies, application of further pressure will bring the disorted plastic sheet into close coincidence with the contours of the die. By observance of these conditions, the rigid sandwich assembly may, for example, be shaped by means of a drawing process similar to that normally applied to sheet metal. This method consists of drawing a metal sheet (or in this case the sandwich assembly) over a male die having the desired contours, while simultaneously maintaining a high uniform pressure on the sheet metal or sandwich assembly with an elastic blanket. Such a process is generally known in the metal shaping trade as hydroforming. The sandwich assembly may, of course, be shaped in many different ways as, for example, between matched metal dies as in a stamping or punching operation.

In the event heat were to be applied during this shaping operation, serious variations in thickness of the plastic sheet would occur due to plastic flow, and as a consequence, the ductile sheet metal would not faithfully reproduce the contour of the die, or dies. In the case of the drawing operation, thickness variation in the deformed plastic sheet would be the most serious problem, while in the case of matched metal dies, folding and distortion of the ductile metal sheet would occur in addition to the material thickness variations. Accordingly, it is important in the molding of certain types of plastic material, that the presence of heat during the formation operation be avoided.

In the production of certain forms of plastic items made from sheet material, it is essential to utilize ductile metal sheets sufficiently thick in order that a rigid shaped assembly may be secured. A minimum requirement necessitates the use of ductile metal sheet of such sufficient thickness in order that the shaped assembly, on removal from the die, will not change shape due to the presence of stresses molded into the distorted plastic sheet component of the assembly. The maximum requirement is that the ductile metal sheet be sufficiently thin in order that it may easily conform to the contours of a die, or dies, without requiring excessive pressure which would produce undesirably thin areas in the distorted plastic sheet, even at ambient temperatures. These maximum and minimum requirements will, of course, vary with different plastic sheet-stocks and must be selected accordingly. In most instances, the ductile metal sheet must possess greater rigidity than the plastic sheetstock.

By mere sandwiching of plastic sheetstock between ductile metal sheets and the formation thereof, as described hereinbefore, the rigid assembly contains a distorted plastic sheet that is under considerable stress. If the assembly were to be dismantled at this stage in the process, the shaped plastic component would tend to resume its intitial configuration due to elastic "memory." This "memory" is sufficiently strong as to enable a visual observation of the shaped part returning to its original configuration. If the rigid shaped assembly were permitted to remain intact and allowed to stand at ambient temperatures for long periods of time such as from several months to several years, the stresses in the distorted sheet would slowly decay to zero and a substantially dimensionally stable shaped component would result. However, in order that the process may be made practical, the the decay of stresses in the shaped plastic component of the rigid assembly must be accelerated. Such acceleration of decay may be accomplished by application of heat thereto. The specific temperature to which the rigid assembly is heated, and the time that it is allowed to remain at this temperature, depends upon the stress-decay characteristics of the particular plastic material being molded. Additionally, it is essential that the temperature be maintained to substantially below the softening, fusion or melting point of the plastic. If such control of the temperature is not maintained and the temperature is allowed to reach or rise above the softening point of the material, the plastic component of the rigid assembly will become adhesively bonded to the ductile metal components, thereby resulting in a situation preventing disassembly of the rigid assembly at the end of the process without prohibitive distortion, breaking or tearing of the plastic part. Furthermore, it is essential that the rigid assembly be maintainer at temperatures substantially below the softening, fusion or melting point of the material in order that the plastic component thereof will not crystallize, thus losing, to a great degree, the desirable mechanical properties of the initial plastic sheetstock. This requirement is particularly necessary when the plastic sheetstock is, for example, polytertofluoroethylene, polytrifluorochloroethylene, and the like falling in the group of plastic fluorinated hydrocarbon materials.

In another instance, it is a further essential requirement that the temperature during the heating step be maintained substantially below the fusion point of the material of the plastic component of the rigid assembly to prevent the formation of defective shaped parts, due to possible gassing of the plastic component at or above its fusion temperature. Such gassing of the material usually results from incipient decomposition of the plastic material. This is again particularly true of polytetrofluoroethylene, and polytrifluorochloroethylene. Should gassing be permitted during formation of the present plastic article, no means is provided to permit the escape of the evolved gasses from the shaped rigid assembly and unusable parts would thereby result.

It is, therefore, one important object of the present invention to provide a novel method for molding a thin shaped plastic article having controlled dimensions and being made from plastic sheetstock.

It is another object of the invention to provide a novel process for shaping plastic sheetstock of controlled thickness without the use of accurately matched metal molds.

A further object of the invention is to provide a novel process for molding plastic material wherein to make available substantially, dimensionally stable shaped plastic articles from plastic sheetstock.

It is still another important object of the invention to provide a novel process for molding plastic articles from materials available only in sheetstock and which cannot either be injection molded or formed in any other manner.

It is a still further important object of the invention to provide a novel process for forming plastic sheetstock material including means for maintaining the desired configuration of the material while under stress conditions and until such stresses may be relieved therein.

Other and further important objects of the invention will become apparent from the disclosures of the following detailed specification, appended claim and accompanying drawing, wherein:

Figure 1 is a side elevational view of a molded sheet of plastic material, disposed for use in position over a supporting component;

Fig. 2 is a side elevational view of the plastic sheetstock employed herein;

Fig. 3 is a sectional view of the plastic sheetstock sandwiched between sheets of ductile metal, a portion of this view being enlarged for clarity;

Fig. 4 is a sectional view illustrating one example of the forming step that may be employed in practicing this invention;

Fig. 5 is an enlarged fragmentary sectional view showing details of the forming step utilizing portions of the mechanism illustrated in Fig. 4;

Fig. 6 is an enlarged fragmentary section view illustrating one edge portion of the formed rigid assembly;

Fig. 7 is a view similar to Fig. 6, illustrating one edge of the rigid assembly as it appears when formed by an alternative method of molding; and Fig. 8 is a sectional view illustrating mechanism for accomplishing the heating step in the practice of the present process.

With reference to the drawing, Fig. 1 illustrates one typical embodiment for use of the plastic article manufactured by the present process. As shown in Fig. 1, a projectile body 10 is fitted with a nose portion 11 that is generally semispherical. In many types of projectiles it is important that the interior thereof be maintained at as low a temperature as possible, commensurate with problems involved in ram air induced temperature rise. It has been found that application of a thin layer in certain types of plastic material over the nose section 11 will effectively reduce the temperature rise within this nose section. Plastic material commonly used for this purpose may be, for example, polytetrofluoroethylene and polytrifluorochloroethylene. These plastic materials are not readily moldable as by injection methods or matched dies as it is important that thickness variations in the plastic material be maintained within close tolerances. The semispherical plastic article is shown at 12 as being positioned in intimate contact with the nose portion 11 and may be secured thereto as by an adhesive, or the like.

In practicing the several steps of the present invention, as shown in Fig. 2, a circular sheet 13 of the plastic material is first, as indicated in Fig. 3, sandwiched between sheets 14 and 15 of ductile metal such as steel, for example. It is to be noted that the sheet 15 is of substantially greater thickness than the sheet 14 for a purpose that will be hereinafter more fully described.

Following establishment of the sandwich structure, a rigid assembly is thereafter produced as by means of a hydroforming device indicated generally at 16. In general, such hydroforming devices include a housing 17 having an opening in one end thereof in which a diaphragm 18 of flexible material such as rubber, for example, is positioned. An elastic blanket on the housing side of the diaphragm 18 is established by means of a quantity of liquid such as oil 20, disposed within the housing, means being provided to maintain a high pressure on the oil 20 such as by way of a conduit 21 that may extend to a suitable pump (not shown), for example.

In the forming process, the ductile sheet 14 of the sandwich arrangement is disposed in contact with the flexible diaphragm 18 and the sandwich is initially positioned by means of a retaining member 22, one side of which engages the ductile sheet 15. The retaining member 22 is provided with an annular bore 23 therein, in which a ram member 24, having a contoured head portion 25, is slidably disposed. The ram member 24 is adapted to be moved in a direction toward the interior of the housing 17, whereby to deform the sandwich assembly in accordance with the dotted lines in Fig. 4. The existence of the high pressure elastic blanket, established by the oil 20 which may be maintained under approximately 14,000 to 15,000 p.s.i. serves to insure intimate contact between the flexible diaphragm 18 and the exterior surface of the metal sheet 14, in order to effect close conformity with the contours of the contoured head 25.

As shown in Fig. 5, as the contoured forming head 25 moves in a direction to deform the sandwich structure, a portion of the material of the flexible member 18 is adapted to flow about an edge of the rigid assembly thus formed, as shown at 26, in order radially inwardly to crimp a free edge of the metal sheet 14, as shown at 27 in Fig. 6. This inward crimping action serves to position the free edge of the metal sheet 14 over the free edges of the plastic material 13 and the inner metal sheet 15 to produce the desired rigid sandwich structure and retain all of the components in fixed relationship relative to each other.

As stated hereinbefore, the forming operation, by means of the hydroform shown in Fig. 4, is accomplished at ambient temperatures, whereby to prevent plastic flow of the sheet 13 and to maintain the precise thickness of the sheet and the plastic component 12 formed therefrom. However, following this forming operation, a considerable amount of stress is imposed into the material of the sheet 13, even though the formed configuration is precisely maintained by means of the supporting formed metallic sheets 14 and 15. By provision of the inner metallic sheet 15 of greater thickness than the outer sheet 14, smooth contours are maintained in the metallic components of the rigid sandwich assembly and wrinkling of the sheet 15 is eliminated.

As shown in Fig. 7, in some forming processses that may be employed herein as, for example, when matched dies are utilized rather than devices such as the hydroform illustrated in Fig. 4, inward crimping of the outer sheet 14 may be more irregular, as shown at 28, but still serves to perform the same purpose: that of maintaining the assembly together as the rigid structure.

In order to relieve the stresses induced in the sheet 13 by the forming step thereof, as shown in Fig. 8, the rigid assembly defined by the plastic sheet 13 sandwiched between the shells of metallic sheets 14 and 15, is placed in a region of elevated temperature as, for example, in a heated oven 30. The temperature in the oven may be in the order of from 400° to 500° F. and the rigid assembly is subjected to this temperature for a period of from 4 to 5 minutes or at approximately 250° F. for about 3 hours. The heating of the rigid assembly is, as stated before, to a temperature that is below the softening, melting or fusion point of the plastic material, and is maintained for a sufficient time to relieve the stresses induced by the forming step in the material 13.

Following the heating step, the rigid assembly is permitted to cool at ambient temperatures and the crimped edge 27 is radially outwardly straightened, as shown by the dotted lines of Fig. 6, whereby to free the inner metallic sheet 15 and the formed plastic sheet 13 from the outer formed metallic sheet 14. It has been found that by applying a jet of compressed air in the region of the edges of the metallic sheets 14 and 15 and the formed plastic sheet 13, a pressure differential may be induced between these components, whereby to enable easy disassembly thereof.

Following removal of the formed plastic sheet 13 from the metallic sheets 14 and 15, the free edge thereof may be trimmed to the desired length in order thus to produce a semispherical cover 12 for disposition on the projectile nose portion 11. Additionally, it is to be understood that the cover 12 may be trimmed before removal from the formed sheets by simultaneously cutting both the sheets 14 and 15 together with the formed sheet 13.

While several attempts have been made heretofore relative to similar plastic material forming processes, these attempts have had several disadvantages and have failed to include teachings relative to the necessities required for forming of particular plastic materials. In most instances, prior forming methods have employed temperatures at least as high as the fusion point of the plasic during the forming operation; have not simultaneously molded the metal sheets and plastic sheet-stock sandwich to a rigid assembly; or have employed adhesive prelamination of a transparent plastic sheet with a cushioning thermo-plastic sheet. Thus, the present invention, while being most practically applied to certain types of plastic molding requirements, presents a novel combination of process steps, all of which cooperate toward a single end result: that of producing a shaped plastic article from normally intractable sheetstock.

Having thus described the invention and the present specific process and steps thereof, it is desired to emphasize the fact that several modified processes may be employed in the formation of plastic articles in a manner limited only by a just interpretation of the following claim:

I claim:

The process for forming articles from sheet plastic fluorinated hydrocarbon material comprising, in combination, the steps of: disposing a solid thin sheet of said plastic material between metallic sheets of material to form a layered assembly, said metallic sheets having greater rigidity than said sheet of plastic material the innermost of said sheets of material being of a thickness greater than the outermost thereof; cold forming the layered assembly to the desired configuration of the plastic material and at a formation pressure of 14,000 to 15,000 p.s.i.; maintaining the formed layered assembly in the desired configuration and independent from any apparatus employed during said cold forming; heating said assembly to a temperature of 400° to 500° F., said temperature being near but below a melting point of the plastic material to stress relieve the formed layered assembly and plastic material thereof, said assembly being retained at said temperature for 4 to 5 minutes; air cooling said heated assembly; and removing the metallic sheets of material from the plastic material whereby to expose the formed article.

References Cited in the file of this patent

UNITED STATES PATENTS

| | | |
|---|---|---|
| 1,318,044 | Bechman | Oct. 7, 1919 |
| 1,359,919 | Reardon | Nov. 23, 1920 |
| 1,587,462 | Adams et al. | June 1, 1926 |
| 2,293,914 | Nanfeldt | Aug. 25, 1942 |
| 2,329,867 | Whitehead | Sept. 21, 1943 |
| 2,444,420 | Borkland | July 6, 1948 |
| 2,673,371 | Uhlig | Mar. 30, 1954 |
| 2,781,552 | Gray | Feb. 19, 1957 |
| 2,781,849 | Bladergroen et al. | Feb. 19, 1957 |

FOREIGN PATENTS

| | | |
|---|---|---|
| 650,747 | Great Britain | Feb. 28, 1951 |

OTHER REFERENCES

Plastics Engineering Handbook (The Society of the Plastics Industry), published 1954 by Reinhold Publishing Corp., New York (pages 146, 197, 198 relied on). (Copy in Scientific Library and Division 15.)